United States Patent
Park

(10) Patent No.: US 8,445,155 B2
(45) Date of Patent: May 21, 2013

(54) COMPLEX POWER GENERATION SYSTEM AND METHOD FOR SUPPLYING HEATED WATER THEREOF

(75) Inventor: Soo Young Park, Gyeonggi-Do (KR)

(73) Assignee: Samsung Everland Inc. (KR)

( * ) Notice: Subject to any disclaimer, the term of this patent is extended or adjusted under 35 U.S.C. 154(b) by 0 days.

(21) Appl. No.: 13/336,525

(22) Filed: Dec. 23, 2011

(65) Prior Publication Data

US 2012/0315562 A1 Dec. 13, 2012

(30) Foreign Application Priority Data

Jun. 8, 2011 (KR) .................. 10-2011-0055279

(51) Int. Cl.
*H01M 8/04* (2006.01)

(52) U.S. Cl.
USPC ........... 429/435; 429/436; 429/437; 429/440; 62/238.1

(58) Field of Classification Search
None
See application file for complete search history.

(56) References Cited

U.S. PATENT DOCUMENTS

| 2006/0123820 A1* | 6/2006 | Kim et al. ................ 62/238.7 |
| 2008/0261093 A1* | 10/2008 | Kelly et al. ..................... 429/26 |
| 2012/0186278 A1* | 7/2012 | Hayashida ........................ 62/79 |

FOREIGN PATENT DOCUMENTS

| JP | 2002-228296 | 8/2002 |
| JP | 2007-213942 | 8/2007 |
| JP | 2009-36473 | * 2/2009 |
| KR | 10-0802571 | 2/2008 |

* cited by examiner

*Primary Examiner* — Jonathan Crepeau
(74) *Attorney, Agent, or Firm* — Ostrolenk Faber LLP

(57) ABSTRACT

A complex power generation system according to an embodiment of the present invention may include a fuel cell module having a first heat exchanger and a second heat exchanger configured to generate a direct current by means of an electrochemical reaction between hydrogen and oxygen, a first cycle configured to receive hot water in a first temperature range from the first heat exchanger to supply to a heat pump, and receive hot water in a second temperature range from the heat pump to supply to the first heat exchanger, and a second cycle configured to receive hot water in a third temperature range from the heat pump to discharge hot water in a fourth temperature range through the second heat exchanger, thereby enhancing a heating performance and increasing a thermal efficiency of the overall system.

11 Claims, 4 Drawing Sheets

COMPLEX POWER GENERATION SYSTEM AND METHOD FOR SUPPLYING HEATED WATER THEREOF

RELATED APPLICATION

Pursuant to 35 U.S.C. §119(a), this application claims the benefit of earlier filing date and right of priority to Korean Application No. 10-2011-0055279, filed on Jun. 8, 2011, the contents of which is incorporated by reference herein in its entirety.

BACKGROUND OF THE INVENTION

1. Field of the Invention

The present disclosure relates to an apparatus and method for effectively recycling hot water(i.e., heated water or warm water) in a complex power generation system.

2. Description of the Related Art

At present, electric energy used in buildings is generated by thermal or hydro power stations. Furthermore, electric energy generated by the power stations is supplied to buildings or homes in each region through a transmission line, and the supplied electric energy allows fluorescent lamps, refrigerators, air conditioners, and the like to be operated, thereby making our lives more convenient and productive.

However, thermal energy is converted to electric energy by burning oil or coal in a power station to obtain the electric energy being used at present, and thus the power generation efficiency thereof may be very low compared to that of the used fuel energy, and also a lot of energy loss may occur during the process of supplying the electric energy generated by the power station to buildings in each region through a transmission line, and as a result, the efficiency of electric energy used in each building may be very low compared to the consumption of fuel energy. In other words, excessively a lot of fuel energy may be consumed to obtain electric energy used in each building. In addition, owing to this, there is a problem of causing environmental pollution due to the combustion pollutants produced by burning a lot of fuel energy such as oil or coal.

In recent years, fuel cells for providing an excellent energy efficiency as well as eco-friendly generating electric energy have been developed. The fuel cells may be largely divided into four types such as a Phosphoric Acid Fuel Cell (PAFC), a Molten Carbonate Fuel Cell (MCFC), a Solid Oxide Fuel Cell (SOFC), a Proton Exchange Membrane Fuel Cell (PEMFC), and the like.

Fuel cell is an electrochemical apparatus for directly converting chemical energy into electrical energy by means of an electrochemical reaction, and the basic principle lies in that hydrogen or pure hydrogen obtained by reforming fossil fuels such as petroleum, natural gas, and the like is reacted with oxygen in the air to extract electric energy, and at this time, heat and vapor (water) are produced as by-products.

Accordingly, a complex power generation system for increasing a waste heat recovery rate using waste heat generated from fuel cells may be considered to enhance a heating performance.

SUMMARY OF THE INVENTION

The embodiments of the present invention are to provide a system for recycling particularly hot water at low temperature, among the waste heats generated from a fuel cell module, to enhance an overall thermal efficiency in a complex power generation system for supplying hot water to a heat consumption unit.

In order to accomplish the foregoing task of the present invention, a complex power generation system according to an embodiment of the present invention may include a fuel cell module having a first heat exchanger and a second heat exchanger configured to generate a direct current by means of an electrochemical reaction between hydrogen and oxygen, a first cycle configured to receive hot water in a first temperature range from the first heat exchanger to supply to a heat pump, and receive hot water in a second temperature range from the heat pump to supply to the first heat exchanger, and a second cycle configured to receive hot water in a third temperature range from the heat pump to discharge hot water in a fourth temperature range through the second heat exchanger.

According to an example associated with the present invention, the first temperature range may be 40 to 60° C., and the second temperature range may be 20 to 30° C.

According to an example associated with the present invention, the third temperature range may be 70 to 90° C., and the fourth temperature range may be 95 to 120° C.

According to an example associated with the present invention, the second cycle may be connected to a heating cycle including a plurality of heat consumption units.

According to an example associated with the present invention, hot water supplied to the heat pump in the second cycle may be hot water in a fifth temperature range received from the heating cycle.

According to an example associated with the present invention, the fifth temperature range may be 40 to 60° C.

According to an example associated with the present invention, the heat pump may include an evaporator formed to receive hot water in the first temperature range to discharge hot water in the second temperature range, and a condenser formed to receive hot water in the fifth temperature range to discharge hot water in the third temperature range.

According to an example associated with the present invention, the second cycle may include a branching unit configured to guide a first flow rate of the hot water in a third temperature range discharged from the condenser to the second heat exchanger.

According to an example associated with the present invention, the second cycle may further include a mixer configured to mix a second flow rate of the hot water in a third temperature range discharged from the condenser, which is the remaining flow rate excluding the first flow rate, with hot water in a fourth temperature range discharged from the second heat exchanger to discharge hot water in a six temperature range.

According to an example associated with the present invention, the sixth temperature range may be 90 to 100° C.

According to an example associated with the present invention, the fuel cell module may include a cooling module controlled to cool waste heat generated from the inside thereof.

In order to accomplish the foregoing task of the present invention, there is disclosed a method of supplying hot water in a complex power generation system, and the method may include generating a current by means of an electrochemical reaction between hydrogen and oxygen, and discharging hot water in a first temperature range and a fourth temperature range through a first heat exchanger and a second heat exchanger, respectively, in a fuel cell module, receiving hot water in the first temperature range to discharge hot water in a second temperature range through an evaporator of a heat pump, receiving hot water in a fifth temperature range in a heating cycle through a condenser of the heat pump to discharge hot water in a third temperature range, and mixing hot water in the third temperature range with hot water in the fourth temperature range to supply hot water in a sixth temperature range.

According to an example associated with the present invention, the method may further include supplying hot water in a sixth temperature range to a plurality of heat consumption units in the heating cycle, respectively, through the heating cycle.

In order to accomplish the foregoing task of the present invention, there is disclosed a complex power generation system, and the system may include a fuel cell module having a first heat exchanger and a second heat exchanger configured to generate a direct current by means of an electrochemical reaction between hydrogen and oxygen, a first cycle configured to receive hot water in a first temperature range from the first heat exchanger to supply to a heat pump, and receive hot water in a second temperature range from the heat pump to supply to the first heat exchanger, a heat consumption unit configured to supply hot water in a third temperature range to the second heat exchanger through a branching unit, and a second cycle configured to receive hot water in the third temperature range to discharge hot water in a fourth temperature range through the second heat exchanger.

According to a complex power generation system having the foregoing configuration associated with at least one embodiment of the present invention, waste heat at low temperature in a fuel cell module may be recycled by using a heat pump, thereby enhancing a heating performance and increasing a thermal efficiency of the overall system.

In addition, the exhaust of waste heat may be reduced, thereby decreasing environmental problems due to this, and increasing an economical efficiency due to the recycling of waste heat.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
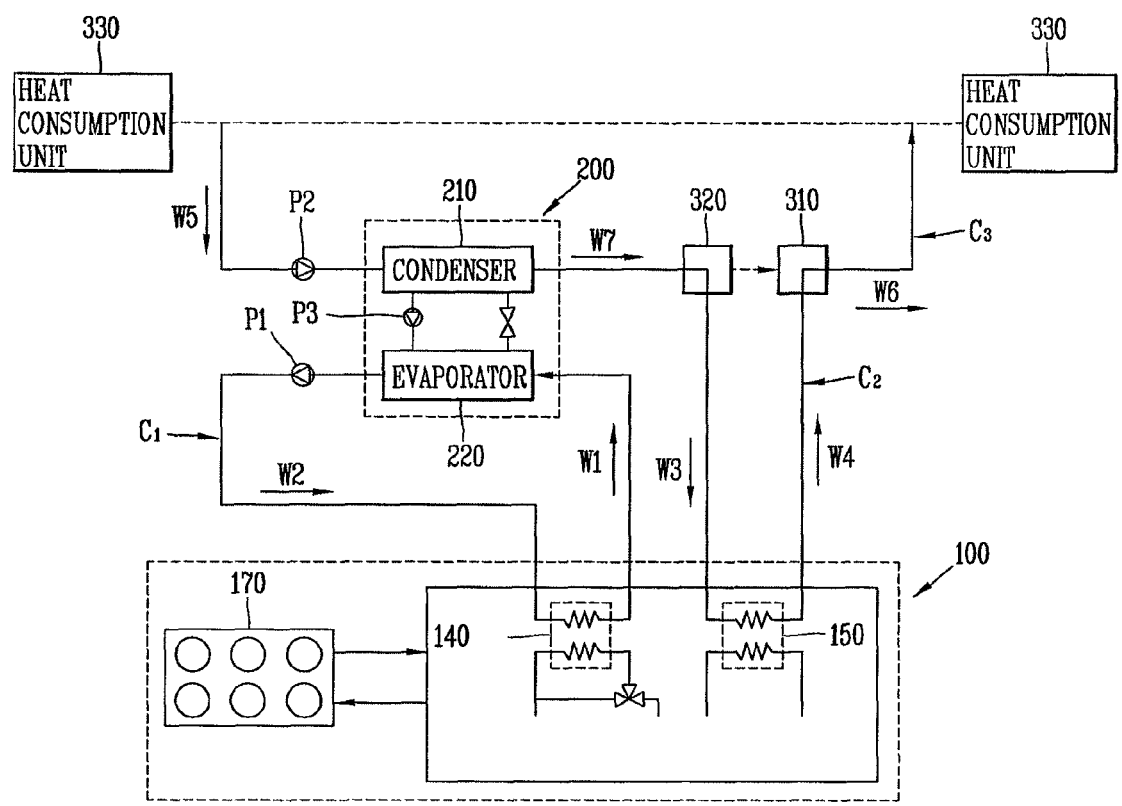
FIG. 1 is a schematic view illustrating a complex power generation system associated with an embodiment of the present invention.

Hereinafter, a complex power generation system and a method of supplying hot water therein according to an embodiment of the present invention will be described in more detail with reference to the accompanying drawings. The suffixes "module" and "unit" for components used in the following description merely provided only for facilitation of preparing this specification, and thus they are not granted a specific meaning or function. This specification employs like/similar reference numerals for like/similar components irrespective of different embodiments, so they all will be understood by the first description. The expression in the singular form in this specification will cover the expression in the plural form unless otherwise indicated obviously from the context.

A complex power generation system according to an embodiment of the present invention may include part of a supply means for supplying hot water to each heat consumption unit that consumes heat, particularly, in a complex power generation system using a fuel cell and a heat pump.

Figure 2:
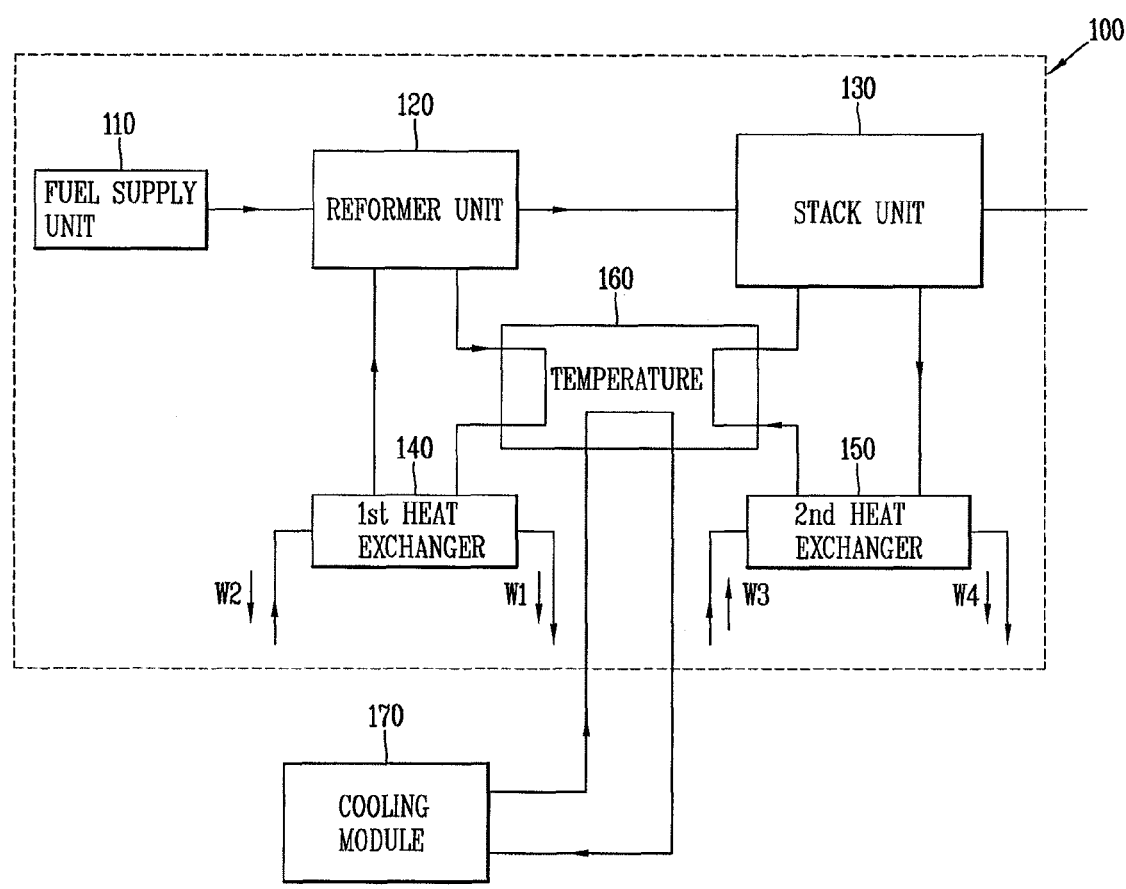
FIG. 2 is a schematic view illustrating a fuel cell module in FIG. 1.
Figure 3:
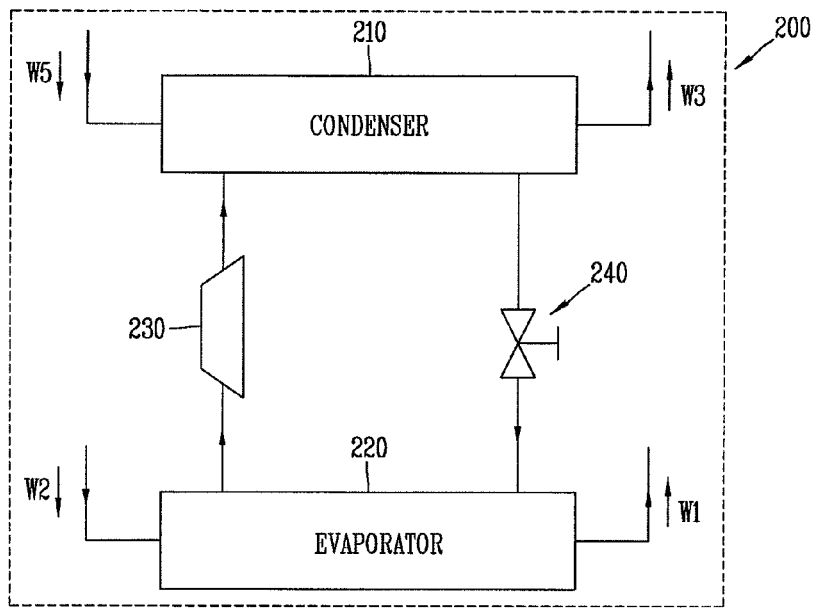
FIG. 3 is a schematic view illustrating a heat pump in FIG. 1.

FIG. 1 is a schematic view illustrating a complex power generation system associated with an embodiment of the present invention, FIG. 2 is a schematic view illustrating a fuel cell module in FIG. 1, and FIG. 3 is a schematic view illustrating a heat pump in FIG. 1.

As illustrated in FIG. 1, a complex power generation system associated with an embodiment of the present invention may include a fuel cell module 100 and a heat pump 200. Furthermore, a thermal circulation cycle (hereinafter, referred to as a "first cycle") for connecting the fuel cell module 100 and the heat pump 200, which are constituent elements of a complex power generation system, may be formed, and a thermal circulation cycle (hereinafter, referred to as a "second cycle") for connecting the fuel cell module 100 and the heating cycle (C3) may be formed. The heating cycle (C3) may include a heat consumption unit 330 as a heat consumption subject. Here, the heat consumption unit 330 may refer to a consumer, such as a typical home or factory, for consuming heat.

In the first cycle (C1), hot water in a first temperature range (W1) flows into an evaporator of the heat pump 200, and hot water in a second temperature range (W2) is discharged therefrom to flow into a first heat exchanger 140 of the fuel cell module 100. In the second cycle (C2), hot water in a third temperature range (W3) flows into a second heat exchanger 150 of the fuel cell module 100, and hot water in a fourth temperature range (W4) is discharged therefrom.

In the heating cycle (C3), part of the hot water in a third temperature range (W3) discharged from the evaporator is guided to the second cycle (C2) through a branching unit 320. The branching unit 320 may be formed with a flow rate controllable 3-way valve. The hot water in a third temperature range (W3), which is the remaining water excluding the foregoing part thereof, is mixed with hot water in a fourth temperature range (W4) in a mixer 310 and supplied to the heat consumption unit 330.

Here, hot water supplied to each heat consumption unit 330 is supplied in a sixth temperature range (W6) at the time of initial supply. The temperature of finally supplied hot water based on a distance of each heat consumption unit 330 may be reduced by heat transfer and the like.

Furthermore, the temperature of hot water recovered from each heat consumption unit 330 may be in a fifth temperature range (W5). The temperature of finally received hot water in a fifth temperature range (W5) may vary based on seasonal and environmental change.

Each cycle illustrated in FIG. 1 may include an inverter control type circulation pump capable of detecting a temperature change in each cycle and controlling a flow rate thereof. The flow rate of hot water circulated in each cycle may be controlled by using such a circulation pump to control the temperature of hot water flowing into or discharged from the fuel cell module 100, heat pump 200, and heat consumption unit 330.

As illustrated in FIG. 2, the fuel cell module 100 may include a fuel supply unit 110 for supplying a predetermined amount of fuel, a reformer unit 120 for receiving fuel from the fuel supply unit 110 to produce hydrogen gas and heat as by-products, and a stack unit 130 for generating electricity and heat by means of an electrochemical reaction between hydrogen produced from the reformer unit 120 and separately supplied oxygen.

The reformer unit 120 may include a reactor and a burner therein, and the stack unit 130 may be configured by stacking a plurality of unit cells including a fuel electrode, an electrolyte membrane, and an air electrode.

Furthermore, the stack unit 130 is connected to a first heat exchanger 140 to use the generated heat, and the stack unit 130 is connected to a second heat exchanger 150 to use the generated heat.

The first heat exchanger 140 and second heat exchanger 150 are connected to a temperature controller 160 configured to control the temperature inside the fuel cell module 100, and the temperature controller 160 is connected to an cooling module 170 to control heat generated from the inside thereof.

The operation of the foregoing fuel cell module 100 will be described as follows.

First, if fuel containing liquefied natural gas (LNG) or methane ($CH_4$) and water are supplied to the reformer unit 120, then a steam reforming reaction and a partial oxidation reaction may occur in a complex manner in the reformer unit 120 to generate hydrogen gas, heat of reaction and other by-products containing water.

Furthermore, in the stack unit 130, hydrogen gas supplied from the reformer unit 120 and separately supplied oxygen may cause an electrochemical reaction to generate electricity, heat, and water. The electrochemical reaction generated from a unit cell constituting the stack unit 130 will be described in more detail. First, when the hydrogen gas ($H_2$) is supplied to a fuel electrode (anode; also referred to as an oxidation electrode), an electrochemical reaction may occur in such a manner that the hydrogen gas is ionized and oxidized to hydrogen ions (H+) and electrons (e−).

The ionized hydrogen ions move to an air electrode (cathode, also referred to as a reduction electrode) through an electrolyte membrane while the electrons move through the fuel electrode. The hydrogen ions moved to the air electrode cause an electrochemical reduction reaction with oxygen supplied to the air electrode while generating heat of reaction and water as well as moving electrons, thereby generating electric energy.

Among the heats generated during the fuel cell operation process, the hot water at high temperature generated from the second heat exchanger 150 may be effectively used, but the hot water at low temperature less than 60° C. generated from the first heat exchanger 140 cannot be used, and thus most of the heats may be dissipated into the air, thereby resulting in ineffectiveness in the aspect of economy and environment.

Accordingly, the overall thermal efficiency may be increased by allowing the hot water at low temperature to be supplied as a heat source of the heat pump 200, and to be discharged as hot water having temperatures greater than a predetermined value.

FIG. 3 is a schematic view illustrating a heat pump 200 that can be used for such an application. The heat pump 200 refers to an apparatus for generating hot water at high temperature using unused energy at low temperature as a heat source through a refrigerant cycle including processes such as evaporation, compression, condensation, and expansion. Various heat sources such as river water, sea water, sewage, cooling water, and the like may be used for the unused energy.

Refrigerant is evaporated (vaporized) with heat at low temperature in the evaporator 220 to absorb a large amount of heat, and the refrigerant gas is compressed to produce gas at high temperature and high pressure through a compression process in the compressor, and the compressed gas is supplied to the condenser 210. At this time, hot water is generated and the refrigerant gas is changed into a liquid phase during the process of exchanging heat with compressed refrigerant gas at high temperature in the condenser 210. Then, the pressure thereof is reduced while passing through the expansion valve 240 and then a cycle for supplying the refrigerant to the evaporator 220 is repeated again.

The heat pump 200 is a highly economical system because 70-80 percent of the entire consumed energy, unused energy at low temperature, is used as a heat source, and only the remaining 20-30 percent thereof is used as electric energy.

Furthermore, for the application of the heat pump 200, the efficiency thereof may be further increased when the unused energy supply location (for example, a first heat exchanger) used as a heat source is located adjacent to the heat supply object (for example, a heating cycle), and thus the heat pump 200, the foregoing unused energy supply location, and the heat supply object should be formed adjacent to one another.

Figure 4:
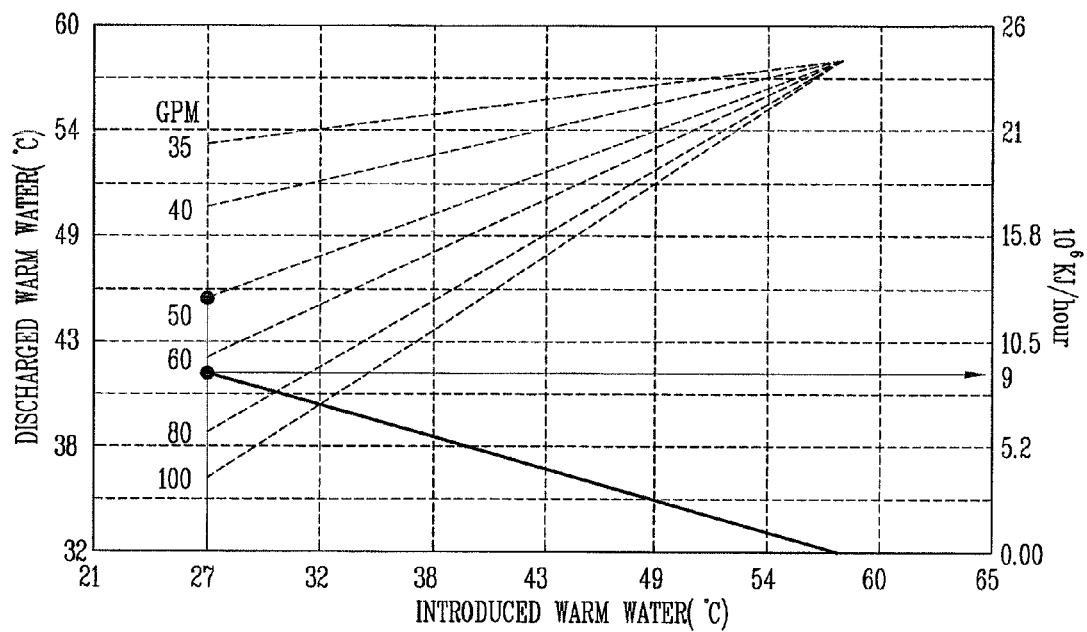
FIG. 4 is a graph illustrating inflow hot water and discharge hot water through a first heat exchanger.
Figure 5:
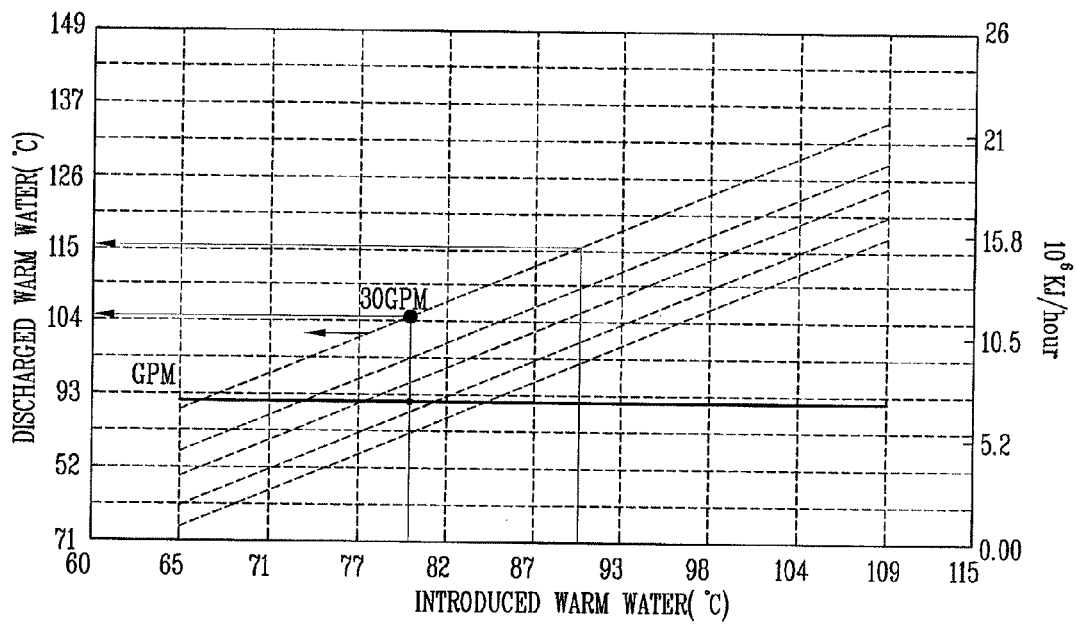
FIG. 5 is a graph illustrating inflow hot water and discharge hot water through a second heat exchanger.

FIG. 4 is a graph illustrating inflow hot water and discharge hot water through a first heat exchanger 140, and FIG. 5 is a graph illustrating inflow hot water and discharge hot water through a second heat exchanger 150.

The optimal temperature range of hot water flowing into or discharged from each constituent element in a complex power generation system will be described below with reference to FIGS. 1, 4, and 5.

Referring to FIG. 4, if hot water at about 27° C. flows into the first heat exchanger 140 and hot water at about 45° C. is discharged therefrom, then the first heat exchanger 140 having a flow rate of about 227.1 L/min may have a waste heat recovery rate of about $9 \times 10^9$ J/hour.

In addition, referring to FIG. 5, if hot water at about 80° C. flows into the first heat exchanger 140 and hot water at about 105° C. is discharged therefrom, then the second heat exchanger 150 having a flow rate of about 113.55 L/min may have a waste heat recovery rate of about $7.2 \times 10^9$ J/hour.

As a result, according to an embodiment of the present invention, for an optimal temperature range for circulating each cycle, hot water in a first temperature range (W1) discharged from the first heat exchanger 140 is controlled to be 40 to 60° C., and hot water in a second temperature range (W2) flowing into the first heat exchanger 140 is controlled to be 20 to 30° C. Furthermore, hot water in a third temperature range (W3) flowing into the second heat exchanger 150 is controlled to be 70 to 90° C., and hot water in a fourth temperature range (W4) discharged therefrom is controlled to be 95 to 120° C., thereby obtaining an optimal waste heat recovery rate in a system.

Furthermore, hot water in a six temperature range (W6) supplied to each heat consumption unit 330 through the heating cycle (C3) may be preferably controlled to be about 90 to 100° C., and hot water in a fifth temperature range (W5) recovered from the heat consumption unit 330 may be preferably to be controlled to be about 40 to 60° C.

In this manner, the additionally produced amount of heat energy in a complex power generation system according to an embodiment of the present invention may reach about 1.4×

$10^9$ to $2.0\times 10^9$ cal/hour by recycling hot water at low temperature generated from the first heat exchanger 140 through the heat pump 200.

As described above, in a complex power generation system according to an embodiment of the present invention, waste heat at low temperature in a fuel cell module that is not used by the cooling module may be recycled, thereby enhancing a heating performance and increasing a thermal efficiency of the entire system. Furthermore, the exhaust of waste heat may be reduced, thereby decreasing environmental problems due to this, and increasing an economical efficiency due to the recycling of waste heat.

Figure 6:
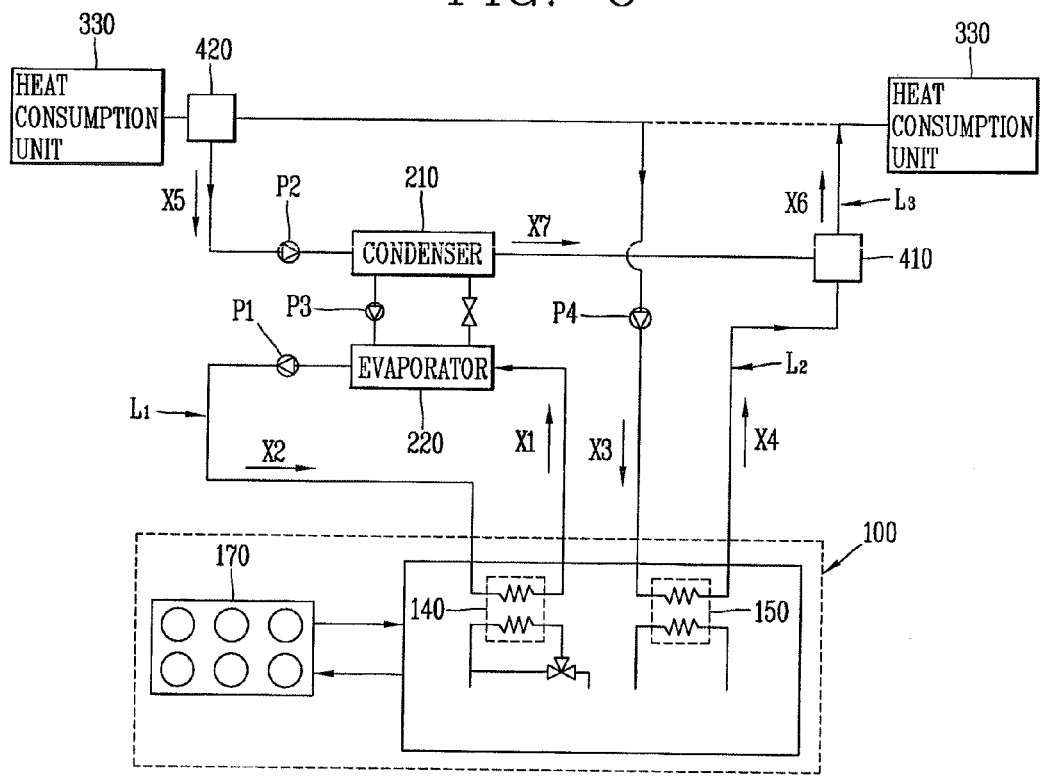
FIG. 6 is a schematic view illustrating a complex power generation system associated with another embodiment of the present invention.

FIG. 6 is a schematic view illustrating a complex power generation system associated with another embodiment of the present invention.

As illustrated in FIG. 6, a complex power generation system associated with another embodiment of the present invention may include a fuel cell module 100 and a heat pump 200 similarly to the foregoing embodiment. Furthermore, a first thermal circulation cycle ($L_1$) for connecting the fuel cell module 100 and the heat pump 200, which are constituent elements of a complex power generation system, may be formed, and a second thermal circulation cycle ($L_2$) for connecting the fuel cell module 100 and the heating cycle ($L_3$) may be formed. The heating cycle ($L_3$) may include a heat consumption unit 330 as a heat consumption subject. Here, the heat consumption unit 330 may refer to a consumer, such as a typical home or factory, for consuming heat.

In the first thermal circulation cycle ($L_1$), hot water in a first temperature range (X1) flows into an evaporator of the heat pump 200, and hot water in a second temperature range (X2) is discharged therefrom to flow into a first heat exchanger 140 of the fuel cell module 100. In the second cycle ($L_2$), hot water in a third temperature range (X3) flows into a second heat exchanger 150 of the fuel cell module 100, and hot water in a fourth temperature range (X4) is discharged therefrom.

Contrary to the foregoing embodiment, hot water in a seventh temperature range (X7) discharged from the condenser 210 is mixed with hot water in a fourth temperature range (X4) in a mixer 410 and supplied to the heat consumption unit 330 as hot water in a sixth temperature range (X6). In the branching unit 420, hot water is divided into hot water in a third temperature range (X3) and hot water in a fifth temperature range (X5), and the hot water in a fifth temperature range (X5) flows into the heat pump, and the hot water in a third temperature range (X3) flows into the second heat exchanger 150. The branching unit 420 may be formed with a flow rate controllable 3-way valve.

Here, hot water supplied to each heat consumption unit 330 is supplied in a sixth temperature range (X6) at the time of initial supply. However, the temperature of finally supplied hot water based on a distance of each heat consumption unit 330 may be reduced by heat transfer and the like.

Furthermore, the temperature of hot water recovered from each heat consumption unit 330 may vary based on seasonal and environmental change. Accordingly, according to this embodiment, a hot water regulator may be further added to the hot water flowing into the branching unit 420 or discharged from the branching unit, thereby increasing the efficiency. In this case, a second branching unit may be added to supply hot water recovered from the heat consumption unit 330 to the first heat exchanger 140 of the fuel cell module.

Each cycle illustrated in FIG. 6 may include an inverter control type circulation pump capable of detecting a temperature change in each cycle and controlling a flow rate thereof. The flow rate of hot water circulated in each cycle may be controlled by using such a circulation pump to control the temperature of hot water flowing into or discharged from the fuel cell module 100, heat pump 200, and heat consumption unit 330.

According to this embodiment, for an optimal temperature range for circulating each cycle, hot water in a first temperature range (X1) discharged from the first heat exchanger 140 is controlled to be 40 to 60° C., and hot water in a second temperature range (X2) flowing into the first heat exchanger 140 is controlled to be 20 to 30° C. Furthermore, hot water in a third temperature range (X3) flowing into the second heat exchanger 150 is controlled to be 40 to 60° C., and hot water in a fourth temperature range (X4) discharged therefrom is controlled to be 95 to 120° C., thereby obtaining an optimal waste heat recovery rate in a system.

Furthermore, hot water in a six temperature range (X6) supplied to each heat consumption unit 330 through the heating cycle ($L_3$) may be preferably controlled to be about 90 to 100° C., and hot water in a fifth temperature range (X5) recovered from the heat consumption unit 330 may be preferably to be controlled to be about 40 to 60° C.

The configurations and methods according to the above-described embodiments will not be applicable in a limited way to the foregoing complex power generation system and method of supplying hot water therein, and all or part of each embodiment may be selectively combined and configured to make various modifications thereto.

What is claimed is:

1. A complex power generation system, comprising:
    a fuel cell module having a first and a second heat exchanging unit and generating a DC current by an electrochemical reaction between hydrogen and oxygen;
    a first cycle receiving warm water within a first temperature range from the first heat exchanging unit and supplying the received warm water to a heat pump, and receiving warm water within a second temperature range from the heat pump and supplying the received warm water to the first heat exchanging unit;
    a second cycle receiving warm water within a third temperature range from the heat pump and discharging warm water within a fourth temperature range through the second heat exchanging unit; and
    wherein the second cycle is connected to a heating cycle including a plurality of heat consumption units, and
    wherein the warm water supplied from the second cycle to the heat pump is warm water within a fifth temperature range introduced from the heating cycle.

2. The complex power generation system of claim 1, wherein the first temperature range is 40 to 60° C., and the second temperature range is 20 to 30° C.

3. The complex power generation system of claim 2, wherein the third temperature range is 70 to 90° C., and the fourth temperature range is 95 to 120° C.

4. The complex power generation system of claim 1, wherein the warm water within the fifth temperature range is 40 to 60° C.

5. The complex power generation system of claim 1, wherein the heat pump comprises:
    an evaporator formed to allow warm water within the first temperature range to be introduced thereto and warm water within the second temperature range to be discharged therefrom; and
    a condenser formed to allow warm water within the fifth temperature range to be introduced thereto and warm water within the third temperature range to be discharged therefrom.

6. The complex power generation system of claim 5, wherein the second cycle comprises:

a branch unit guiding a first flow rate of the warm water within the third temperature range discharged from the condenser to the second heat exchanging unit.

7. The complex power generation system of claim 6, wherein the second cycle further comprises:

a mixer mixing the remaining second flow rate, excluding the first flow rate, of the warm water within the third temperature range discharged from the condenser with warm water within the fourth temperature range discharged from the second heat exchanging unit and discharging warm water in a sixth temperature range.

8. The complex power generation system of claim 7, wherein the sixth temperature range may be 90 to 100° C.

9. The complex power generation system of claim 1, wherein the fuel cell module comprises a cooling module controlled to cool waste heat generated from the inside the interior thereof.

10. A method of supplying warm water of a complex power generation system, the method comprising:

generating current by an electrochemical reaction between hydrogen and oxygen, and discharging warm water within first and fourth temperature ranges through a first and second heat exchanging units, respectively, in a fuel cell module;

when warm water within the first temperature range is introduced, discharging warm water within a second temperature range through an evaporator of a heat pump;

when a hot temperature within a fifth temperature range of a heating cycle is introduced through a condenser of the heat pump, discharging warm water within a third temperature range; and mixing warm water within the third temperature range with warm water within the fourth temperature range and supplying warm water within a sixth temperature range to the heating cycle.

11. The method of claim 10, further comprising:

supplying warm water within a sixth temperature range to a plurality of heat consumption units of the heating cycle through the heating cycle.

* * * * *